United States Patent [19]

Peterson et al.

[11] Patent Number: 5,476,401
[45] Date of Patent: Dec. 19, 1995

[54] COMPACT WATER JET PROPULSION SYSTEM FOR A MARINE VEHICLE

[75] Inventors: Frank B. Peterson, McLean, Va.; Charles M. Dai, Potomac; John F. McMahon, Rockville, both of Md.

[73] Assignee: The United States of America as represented by the Secretary of the Navy, Washington, D.C.

[21] Appl. No.: 314,301

[22] Filed: Sep. 30, 1994

[51] Int. Cl.$^6$ .................................................. B63H 11/103
[52] U.S. Cl. .................................. 440/42; 60/221; 440/43; 440/47
[58] Field of Search .......................... 440/38, 47, 40–43; 60/221; 114/151

[56] References Cited

U.S. PATENT DOCUMENTS

| | | | |
|---|---|---|---|
| 2,149,155 | 2/1939 | Anderson | 440/47 |
| 3,174,454 | 3/1965 | Kenefick | 440/47 |
| 3,550,547 | 12/1970 | Pleuger et al. | 114/151 |
| 3,942,463 | 3/1976 | Johnson, Jr. et al. | 115/11 |
| 4,086,867 | 5/1978 | Stricker et al. | 115/14 |
| 4,176,613 | 12/1979 | Rickards et al. | 114/67 A |
| 4,239,013 | 12/1980 | Haynes | 440/40 |
| 4,411,630 | 10/1983 | Krautkremer et al. | 440/42 |
| 4,538,996 | 9/1985 | Inwood | 440/38 |
| 4,838,821 | 6/1989 | Krautkremer | 440/40 |
| 5,146,865 | 9/1992 | Lais et al. | 114/151 |
| 5,236,637 | 8/1993 | Hull | 264/22 |
| 5,282,143 | 1/1994 | Shirai et al. | 364/474.29 |

FOREIGN PATENT DOCUMENTS

| | | | |
|---|---|---|---|
| 1321564 | 12/1963 | France | 440/38 |
| 0237291 | 9/1989 | Japan | 440/38 |
| 0162192 | 6/1990 | Japan | 440/40 |

OTHER PUBLICATIONS

Forde, Magnar et al., "Computational Fluid Dynamics Applied to High Speed Craft with Special Attention to Water Intakes for WaterJets", FAST '91 First International Conference on Fast Sea Transportation, vol. 1, (Jun. 1991), pp. 69–89.

Water–Jet Propulsion Unit, Mitsubishi Heavy Industries Ltd., Sales Brochure (1993).

*Primary Examiner*—Sherman Basinger
*Attorney, Agent, or Firm*—Gary G. Borda

[57] ABSTRACT

The invention is directed to an improved water jet propulsion system for a marine vehicle. The water jet propulsion system of the present invention incorporates an unconventional and compact design including a short, steep, hydrodynamically designed inlet duct adapted for mounting to the surface of the vehicle hull and extending internally thereof, a water jet pump having an inlet end attached to the outlet end of the inlet duct, a motor for rotating the pump impeller, a drive shaft located completely outside of the flow path connecting the motor with the pump impeller, a flow passage for discharging accelerated flow received from the pump in a generally rearward direction, and a steering and reversing mechanism pivotably mounted about a substantially vertical axis to the aft portion of the vehicle hull for redirect accelerated flow received from the outlet nozzle so as to provide maneuvering capability to the vehicle.

23 Claims, 7 Drawing Sheets

COMPACT WATER JET PROPULSION SYSTEM FOR A MARINE VEHICLE

STATEMENT OF GOVERNMENT RIGHTS

The invention described herein may be manufactured and used by or for the Government of the United States of America for governmental purposes without the payment of any royalties thereon or therefor.

BACKGROUND OF THE INVENTION

1. Field of Invention

The present invention relates generally to water jet propulsion systems for ships and, more particularly, to a hydrodynamically designed, integrated hull and water jet propulsion system including an inlet duct having a flush inlet and a steep inlet duct inclination angle, a water jet pump having its impeller very near the flush inlet, and a pump drive system with a short drive shaft situated so as not to interfere with flow into the impeller.

2. Brief Description of Related Art

In recent years, marine water jet propulsion has gained acceptance and has begun to challenge the long established dominance of screw propellers. Water jet propulsion offers many advantages over conventional screw propellers including: simplification of mechanical arrangement by eliminating reversing gears, controllable pitch propellers, and long propulsion shafting and associated shaft bearings; flexibility of machinery arrangements and placement of machinery in the hull; improved propulsion plant reliability since the prime mover need not be reversed during maneuvering or backing; elimination of external rudders, shafting, and propellers; improved maneuverability, including ability to turn at zero forward speed; minimized draft allowing improved shallow water operation; and reduced noise.

However, many disadvantages are well known, a significant disadvantage being low propulsive efficiency at speeds less than about 25 knots as shown in FIG. 1. As a consequence, existing water jets have been principally applied to high speed vessels such as planing and semi-planing hulls, hydrofoils, and surface effect ships where operational ranges are generally between 35 to 70 knots. Such water jet designs suffer from poor performance at off design speeds. A further disadvantage of present water jet designs is the method of designing and locating the water jet inlet with respect to the hull. Water jet inlet ducts operate under very complex three-dimensional flow conditions. Consequently, efficiency and cavitation performance of water jets is very dependent on good design of the water intake system. However, prior water jet inlet design methods have been restricted to simple two-dimensional momentum theory and two-dimensional flow regimes. As a result, the design and locating of water jet inlets have been generally confined to considering symmetric flow.

Water jet propulsion systems for marine vehicles usually comprise one or more pumps receiving water from one or more inlets in the hull bottom and discharging an accelerated flow through nozzles which are pointed generally in the direction opposite the direction of travel of the vehicle. Prior art flush and semi-flush mounted water jets have fallen into two categories: conventional shallow-ramp-angle water jets and centrifugal or Schottel type water jets.

Conventional, shallow-ramp-angle water jets, as shown in FIG. 2, are intended primarily for high speed operation. Prior art water jets of this type, and particularly the inlet duct, are designed for optimum efficiency at a particular design condition (i.e., a particular design speed and power). However, efficiency drops off at off design conditions. The inlet duct, if optimized at all, is designed to match the flow at the vehicle design condition. Usually, except in very large projects, a standard inlet duct geometry, which has been found to give acceptable performance, is used. Such water jets have flush or semi-flush inlets and ramp angles (inlet duct inclination angles) that are generally less than about 30° relative to a substantially horizontal hull baseline. Shallow-ramp-angle inlet ducts incorporate a leading edge lip (upstream transition from hull surface to inlet duct) having a long radius of curvature resulting in duct length, from inlet to pump impeller, that is quite long. Consequently, viscous losses in the duct are high. Additional losses are introduced by the pump-motor arrangement. Prior art water jet systems are arranged with pumps located upstream of the inlet and driven by a substantially horizontal drive shaft that passes through the roof or upper ramp of the inlet duct into the flow chamber and, therefore, interferes with the flow into the pump impeller. Conventional water jets of this type have good efficiency at high speeds (generally >30 knots) but poor efficiency at lower speeds. Furthermore, at low ship speeds, flow separation at the inlet may occur due to pump suction induced flow angles that are high relative to the ramp angle.

Schottel type water jets (manufactured by Schottel-Werft Josef Becker GmbH & Co KG, Spay, Germany) and described in U.S. Pat. Nos. 4,411,630 and 4,838,821, are intended primarily for very low speed applications and as maneuvering thrusters due to their excellent bollard pull characteristics. These water jets have a central vertical inlet and vertical drive shaft driving a centrifugal pump impeller. The unit, which is mounted in the hull bottom, includes a rotatable volute and a downwardly inclined outlet nozzle. The volute discharges through the bottom of the hull and is rotatable through 360° for low speed maneuvering. Such water jets have good efficiency at low speed (generally <10–15 knots). However, the efficiency diminishes rapidly above this speed.

Moreover, when water velocity through prior art water jet propulsion systems is very high, low pressure points may be created resulting in cavitation. Cavitation seriously restricts the flow rate of water through the propulsion system and, thus, lowers thrust. Kinetic energy is also wasted because of viscous losses (e.g., friction associated with high speed flow through internal ducts and passages), corner flow, and generation of vortices.

Past water jet propulsion systems have attempted to provide improved propulsive and cavitation performance over a wider speed range by using such devices as variable geometry inlets. However, these mechanically complicated schemes add weight and cost to the system.

Consequently, there is a need for a simple water jet propulsion system having high propulsive efficiency and good cavitation performance at both low speeds and high speeds. There is a further need for a system that offers flexibility of placement while minimizing the various losses associated with water jet propulsion systems.

OBJECTS OF THE INVENTION

Accordingly, it is an object of the present invention to provide a fixed-geometry-inlet water jet propulsion system having high efficiency over a wide speed range.

It is a further object of the present invention to provide a water jet propulsion system having a simple, compact design with a reduced horizontal stacking length to allow flexibility of placement within the hull.

It is a further object of the present invention to provide a water jet propulsion system having a drive shaft of reduced size and weight that is located completely outside the water jet flow path so as not to interfere with the flow.

It is a further object of the present invention to provide an integrated hull and water jet propulsion system having improved cavitation and flow separation characteristics.

It is still a further object of the present invention to provide an integrated hull and water jet propulsion system that minimizes cavitation, internal ventilation, and inlet and duct losses, while maximizing water jet performance characteristics.

Other objects and advantages of the present invention will become apparent to those skilled in the art upon a reading of the following detailed description taken in conjunction with the drawings and the claims supported thereby.

SUMMARY OF THE INVENTION

In accordance with the present invention, an improved water jet propulsion system for a marine vehicle is provided. The water jet propulsion system of the present invention incorporates an unconventional and compact design including: (1) a short, steep, hydrodynamically designed inlet duct, adapted for mounting to the surface of the vehicle hull and extending internally thereof, for introducing water into the system; (2) a water jet pump, having an inlet attached to the outlet end of the inlet duct, for accelerating the water flow; (3) power means for rotating the pump impeller; (4) a drive shaft, situated so as to be completely outside of the flow path, for connecting the power means with the pump impeller; (5) a flow passage ending in an outlet nozzle for receiving an accelerated flow from the pump and discharging it in a generally rearward direction; and (6) a steering and reversing mechanism, pivotably mounted about a substantially vertical axis to the aft portion of the vehicle, for redirecting accelerated flow received from the outlet nozzle to provide maneuvering capability to the vehicle.

The inlet duct is flush mounted in the bottom of the vehicle hull and extends axially between an initial end, which circumscribes an inlet opening and defines an inlet plane, and a terminal end, which circumscribes an inlet exit and defines a terminal plane. The duct has a centrally located reference axis extending from the inlet plane to the terminal plane. The reference axis defines an inlet duct inclination angle of between about 45° and about 75° relative to the inlet plane. The length of the inlet duct from the inlet opening to the inlet exit is less than or equal to about the diameter of the impeller.

The water jet pump includes a casing, preferably a volute casing, having at least one side wall and an end wall forming an impeller chamber, an axial inlet opposite the end wall, at least one outlet, and an impeller rotationally mounted in the impeller chamber for accelerating the flow entering at the pump axial inlet and exiting at the pump outlet. The rotation axis of the impeller is substantially aligned with the reference axis of the inlet duct. The impeller has a back face located adjacent the end wall and a front face having a plurality of radially extending impeller blades projecting axially therefrom toward the axial inlet. A flow passage is defined by the at least one side wall and the front face of the impeller. The pump is attached at its axial inlet to the terminal end of the inlet duct.

The power means may be an electric motor, the electric motor being mounted in juxtaposition with the water jet pump end wall. Preferably, the motor is mounted such that the axis of rotation of its rotating member is substantially aligned with the reference axis of the inlet duct.

The drive shaft is connected at a first end with the power means and at a second end to the back face of the impeller wherein the drive shaft is situated entirely outside the flow passage so as not to interfere with the flow. The drive shaft is substantially aligned with the reference axis of the inlet duct.

The downstream flow passage is connected at a first end to the outlet of the pump and has an outlet nozzle at a second end thereof. The second end is adapted for mounting to an aft portion of the vehicle hull for discharging accelerated flow from the water jet propulsion system.

The steering and reversing mechanism, which receives flow from the outlet nozzle, includes a steering sleeve and at least one reversing vane pivotably mounted to the sleeve. The steering sleeve is pivotably mounted about a substantially vertical axis to the aft portion of the vehicle hull aft of the nozzle. Thus, the steering and reversing mechanism is mounted to the marine vehicle independent of the nozzle and remaining structure of the water jet propulsion system.

According to a further aspect of the present invention an integrated hull and water jet propulsion system for a marine vessel including a hull means and at least one water jet propulsion system as described above, is provided. The shape of the inlet duct and the hull means adjacent the inlet are designed together to provide improved hydrodynamic characteristics.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding element throughout and wherein.

DETAILED DESCRIPTION OF THE PREFERRED EMBODIMENT

Figure 1:
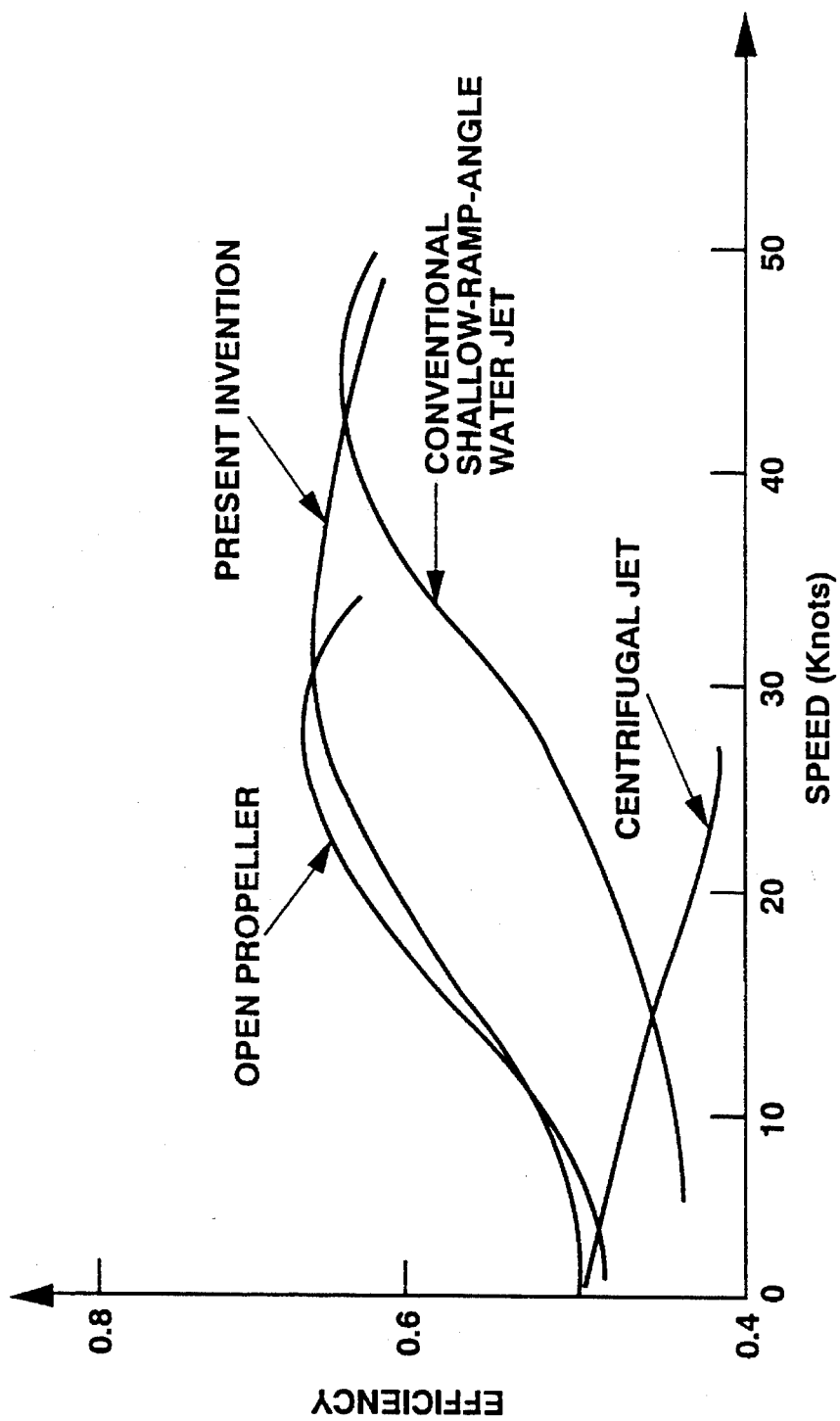
FIG. 1 is a conceptual plot showing propulsive efficiency of the present invention compared to prior art water jets.

Referring now to the drawings, and particularly to FIGS. 3 through 8, the integrated hull and water jet propulsion system of the present invention is shown. Water jet propulsion system 10 is shown mounted in hull means 12. Hull means 12 of the present invention may be a monohull, a planing or semi-planing craft, or any other marine vehicle suitable for use with flush mounted water jets. The outlines of hull means 12 indicate how water jet propulsion system 10 is located and oriented in aft portion 14 of hull means 12. Aft portion 14 is generally that portion of hull means 10 adjacent stern 16 and extending forward of stern 16 about one quarter of the vehicle length measured as at the waterline. The preferred structural elements of water jet propulsion system 10 include hydrodynamically designed, steep, integrated inlet duct 20, mixed-flow type volute pump 30, power means 50, short drive shaft 60 located completely out of the water flow path, downstream flow duct 70, and structurally independent steering and reversing mechanism 80. In a preferred embodiment, a compact system having a reduced stacking height is provided wherein the central axes of integrated inlet duct 20, pump 30, drive shaft 60, and power means 50 are in substantially axial alignment.

Water enters water jet propulsion system 10 through inlet duct 20 which redirects water flowing along hull means 12 into water jet propulsion system 10. Inlet duct 20 (the design of which is more fully described hereinafter) is flush mounting to the surface of hull means 12, generally at aft portion 14 near stern 16, and extends internally thereof. Inlet duct 20 extends between initial end 22, which circumscribes inlet opening 23 and defines the inlet plane of inlet duct 20, and terminal end 24, which circumscribes inlet exit 25 and defines the terminal plane of inlet duct 20. Inlet opening 23 is curvilinear in shape, i.e., has a curvilinear transverse cross-section at the inlet plane that extends from leading edge 23a to trailing edge 23b. The curvilinear transverse cross-section is preferably chosen from the group consisting of a circle, an ellipse and an oval. Centrally located reference axis 26 of inlet duct 20 extends from the inlet plane to the terminal plane. Reference axis 26 is perpendicular to the terminal plane. Inlet exit 25 is circular in shape, i.e., has a circular transverse cross-section at the terminal plane, and is arranged concentrically with reference axis 26. Centrally located reference axis 26 defines inlet duct inclination angle 28. Inclination angle 28 is the angle between reference axis 26 and the inlet plane. Inclination angle 28 is a steep angle, preferably being between about 45° and about 75°.

Compared to prior art shallow-ramp-angle inlet ducts for water jet propulsion systems, inlet duct 20 is short in length from inlet plane to exit plane. In the specification and claims, the term "short" when used in reference to "short inlet duct" 20 is intended to indicate that the preferred length of inlet duct 20 from inlet opening 23 to inlet exit 25 is less than or equal to about the diameter of inlet exit 25. The "short" length of inlet duct 20 minimizes viscous losses and, because water need be raised only a short distance by pump 30, potential energy associated losses are also minimized.

Figure 6:
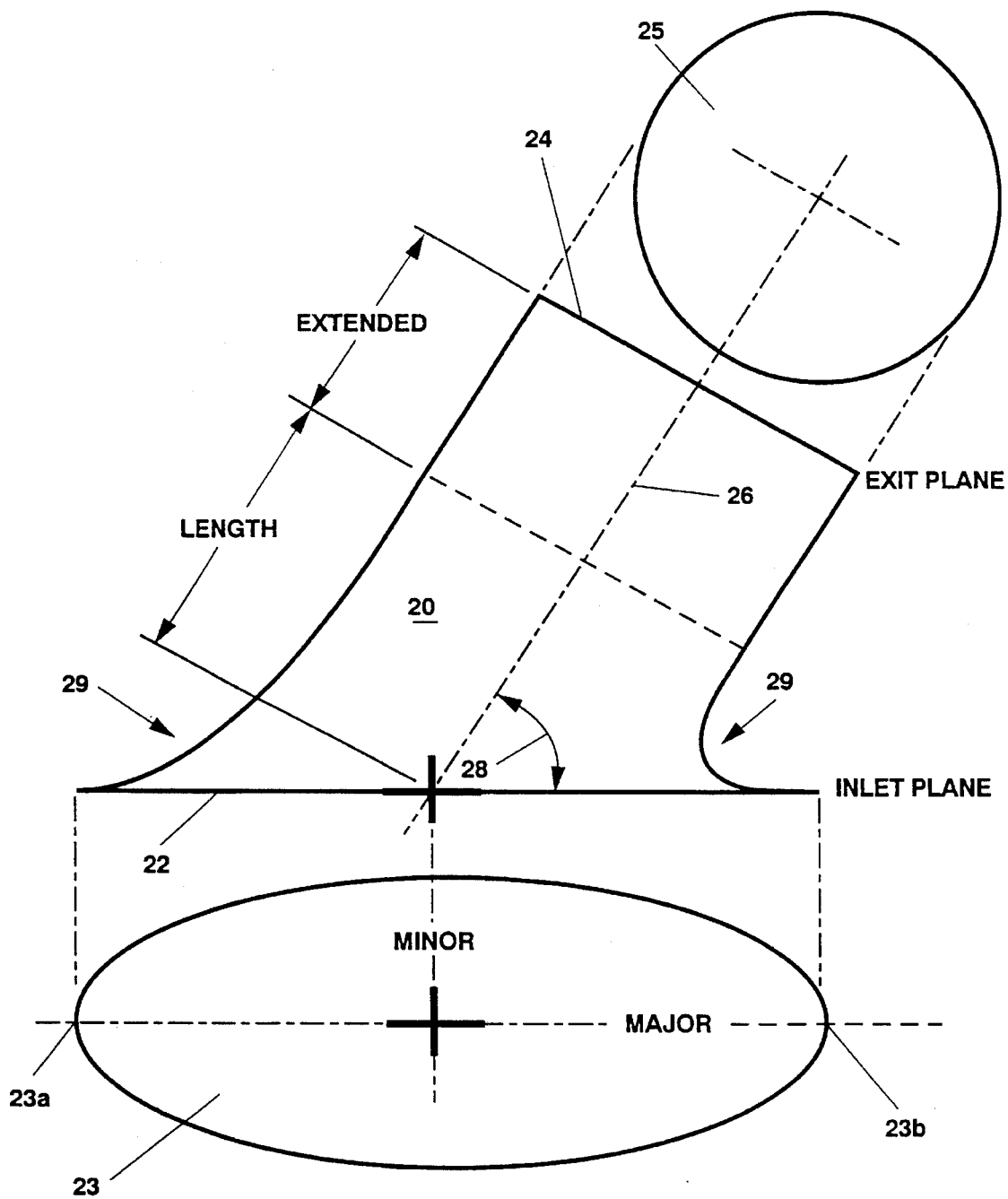
FIG. 6 is an exploded diagrammatic view of the inlet duct of the present invention.
Figure 7:
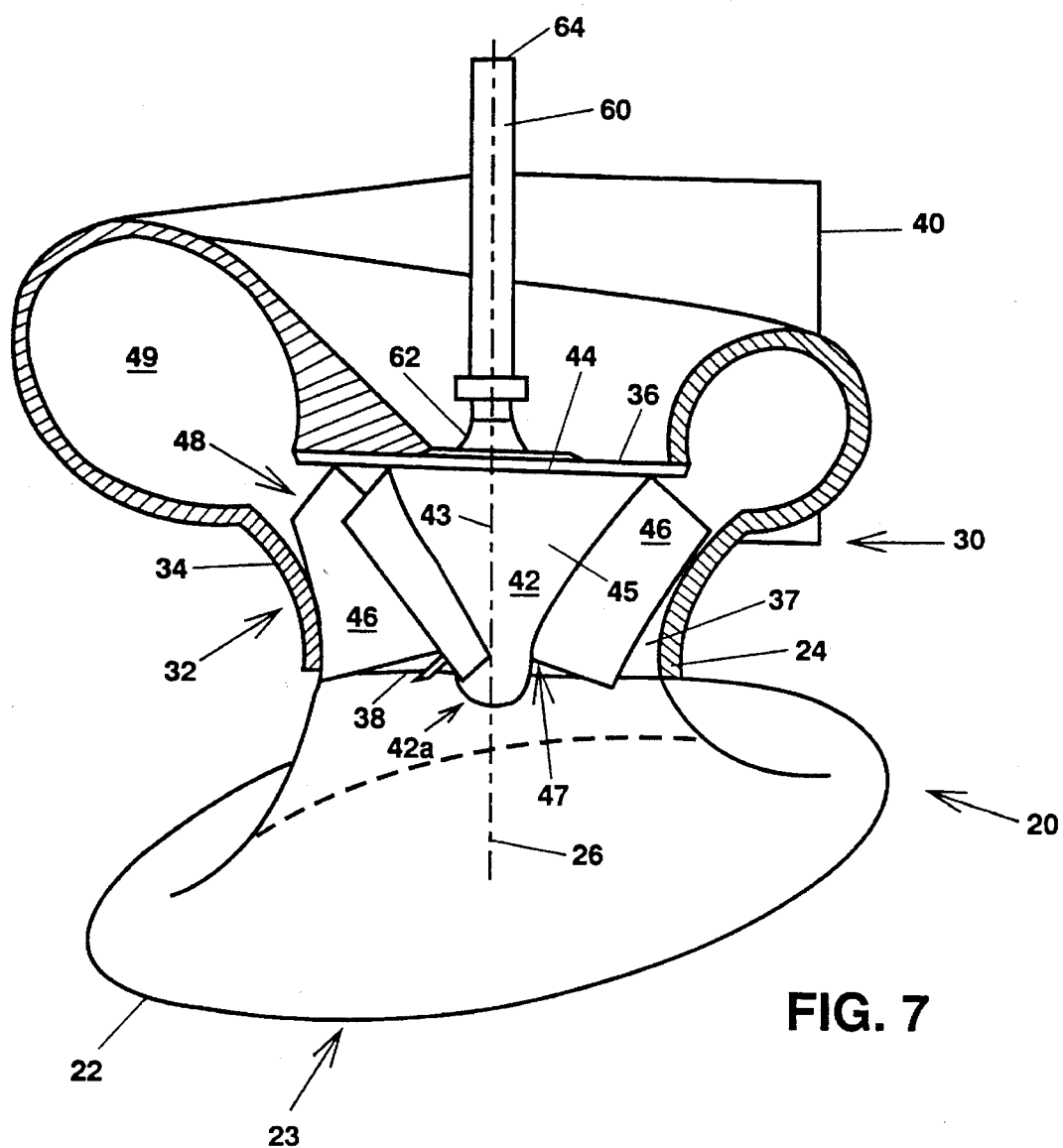
FIG. 7 is a partial sectional side view of the water jet propulsion system of the present invention showing the inlet duct the pump and the short drive shaft.
Figure 8:
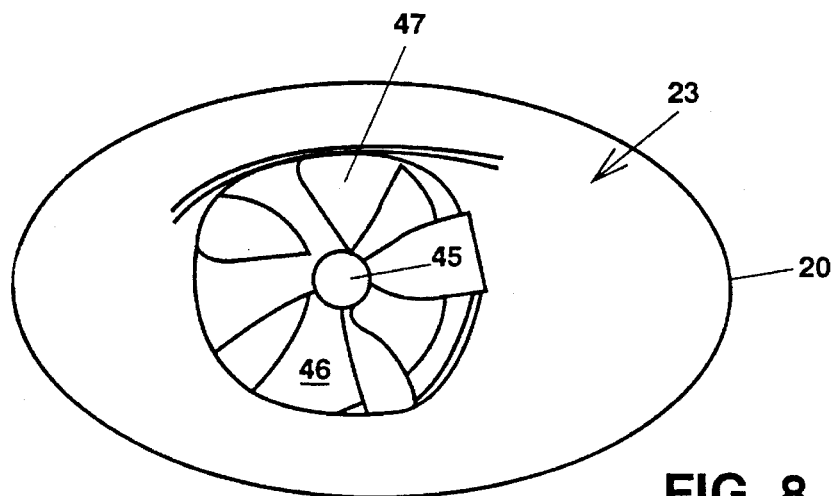
FIG. 8 is a top view of the water jet propulsion system of the present invention.

Inlet duct 20 at initial end 22 is adapted to be mounted flush with the surface of the hull means 12. That is, inlet duct 20 adjacent inlet opening 23 is tangent to the surrounding surface of hull means 12 such that no part of inlet duct 20 protrudes beyond the surrounding surface of hull means 12. Peripheral lip or fillet 29 of inlet duct 20 adjacent inlet opening 23 is hydrodynamically shaped to form a smooth, separation free transition between the surface of hull means 12 and the upstream portion of inlet duct 20 (i.e., that portion of inlet duct 20 adjacent to and immediately downstream of inlet exit 25). Fillet 29 is defined as a region of high curvature relative to remaining portions of inlet duct 20. The curvature in this region need not be constant around the circumference of inlet duct 20 and, as shown in FIG. 6, generally has a more gradual curve adjacent leading edge 23a than adjacent trailing edge 23b. The internal surface of inlet duct 20 defines the shape of the flow passage from inlet opening 23 to inlet exit 25. Preferably, the internal surface of inlet duct 20 is a Bezier surface. The Bezier surface is defined by a series of fifth order Bezier cross-link curves. The Bezier curves are preferably determined by the design methodology that is more fully described hereinafter.

Water jet pump 30, which accelerates the flow introduced by inlet duct 20, may include any well-known positive displacement rotary pumps (e.g., axial, centrifugal, or mixed-flow pumps). The choice of pump is based on the specific speed ($N_s = NQ^{1/2}/H^{3/4}$, where N is pump speed in rpm, Q is flow rate in gpm, and H is pressure head in ft). In the specific speed range envisioned for the present invention, the pump is preferably a mixed-flow pump. More preferably, pump 30 is a high mass flow rate, low head, mixed-flow pump having a mixed-flow impeller therein with a substantially radial discharge. Water jet pump 30 includes pump casing 32 having at least one side wall 34 and end wall 36 forming impeller chamber 37, axial inlet 38 opposite end wall 36, at least one outlet 40, and impeller 42 rotationally mounted in impeller chamber 37 for accelerating flow from axial inlet 38 to outlet 40. Axis of rotation 43 of impeller 42 is substantially aligned with reference axis 26 of inlet duct 20. Impeller 42 of pump 30 is arranged closely above inlet exit 22 of inlet duct 20. Preferable, lowest axial end 42a of impeller 42 is substantially aligned with inlet exit 22. The diameter of impeller 42 is generally less than or equal to the diameter of inlet exit 25 of inlet duct 20. Therefore, the length of "short inlet duct" 20 is generally less than or equal to about the diameter of impeller 42. Impeller 42 includes back face 44 located adjacent end wall 36 and front face 45. Front face 45 has a plurality of radially extending impeller blades 46 projecting axially therefrom toward axial inlet 38. Front face 45 of impeller 42 and side wall 34 define flow passage 47 therebetween. Pump 30 is attached at axial inlet 38 to terminal end 24 of inlet duct 20. Pump 30 is attached to inlet duct 20 in any well known watertight fashion and the attachment method will not be further described herein.

Pump casing 32 preferably comprises a volute casing having axially extending annular flow chamber 48 surrounding impeller 42 and volute shaped flow chamber 49 downstream of impeller 42. Flow entering pump 30 in an axial direction with respect to pump inlet 38 and accelerated by impeller 42 is redirected by volute shaped flow chamber 49 such that it is discharged from outlet 40 in a generally rearward direction (longitudinally with respect to hull means 12). Volute shaped flow chamber 49 has a curvilinear cross-section (e.g., an elliptical cross-section) defining a cross-sectional area. In addition, volute shaped flow chamber 49 defines the turning angle of the flow. Preferably, the cross-sectional area is distributed angularly along volute shaped flow chamber 49 (varies from volute entrance to volute exit) such that the average angular momentum of the flow in volute shaped flow chamber 49 remains constant.

Power means 50 for rotating impeller 42 may include any known marine propulsion plant including mechanical drives (e.g., turbines with associated reduction gearing powered by an appropriate power source) and electric drives. Preferably, power means 50 is an electric drive means either closely-coupled to pump 30 or internally integral with pump 30. As a closely-coupled electric drive motor, power means 50 is located very near to end wall 36 of pump 30. For example, power means 50 may be located adjacent pump 30, e.g., attached directly to pump 30 or end wall 36. Alternatively, power means 50 may be located in juxtaposition with pump 30, e.g., attached to an internal structure, such as a wall or bulkhead, of hull means 12. Preferably, power means 50 is a low-speed electric motor mounted proximate end wall 36 of pump 30 such that axis of rotation 52 of the rotating member of the electric motor is substantially aligned with reference axis 26 of inlet duct 20. Appropriate electric motors for low-speed, high-power applications include both induction and synchronous type motors.

Figure 2:
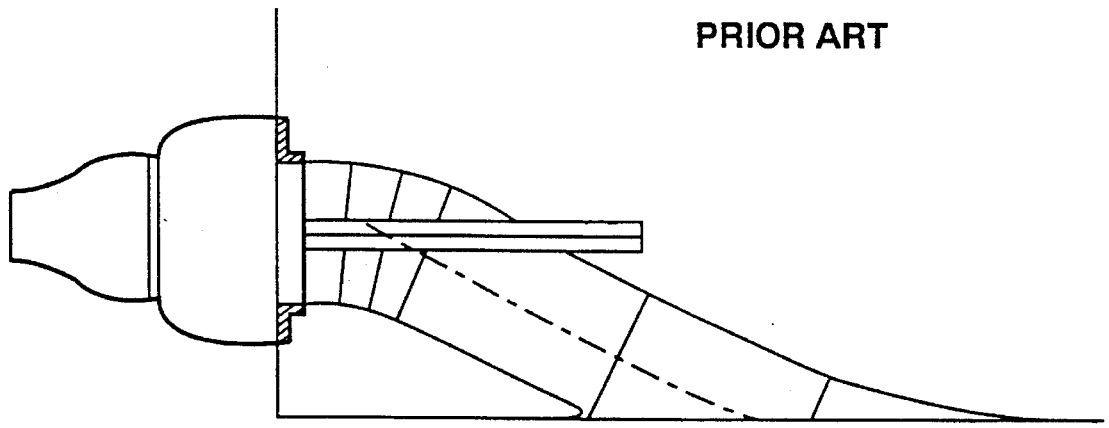
FIG. 2 is a schematic view of a typical prior art shallow-ramp-angle water jet.
Figure 3:
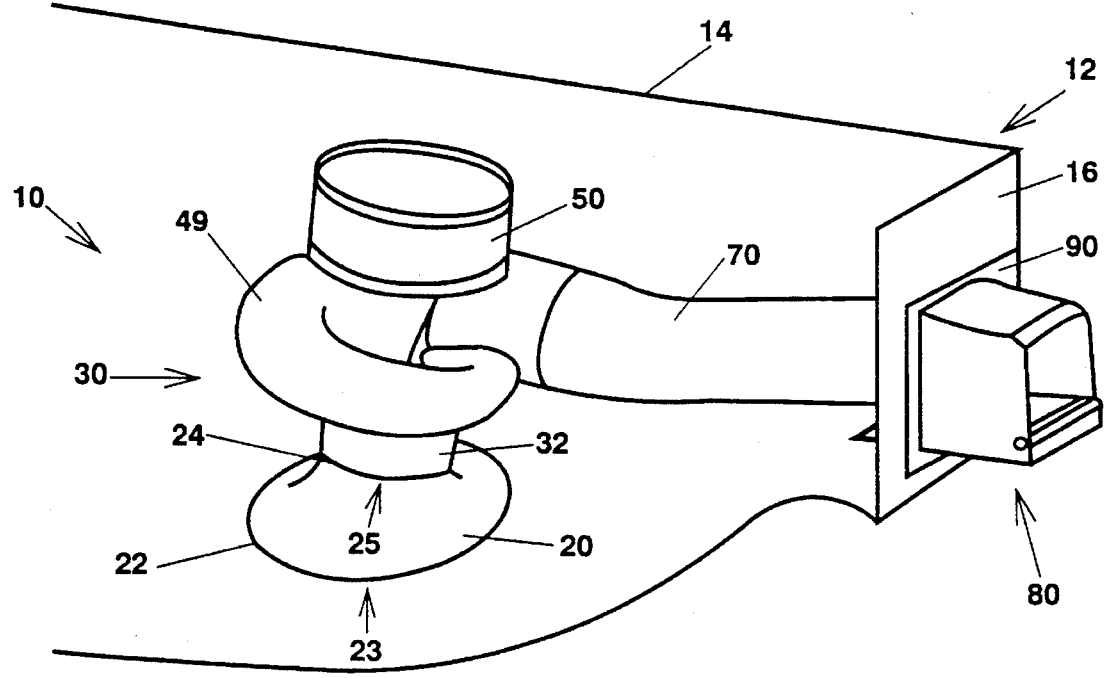
FIG. 3 is a perspective view showing the water jet propulsion system of the present invention mounted in a marine vehicle.
Figure 4:
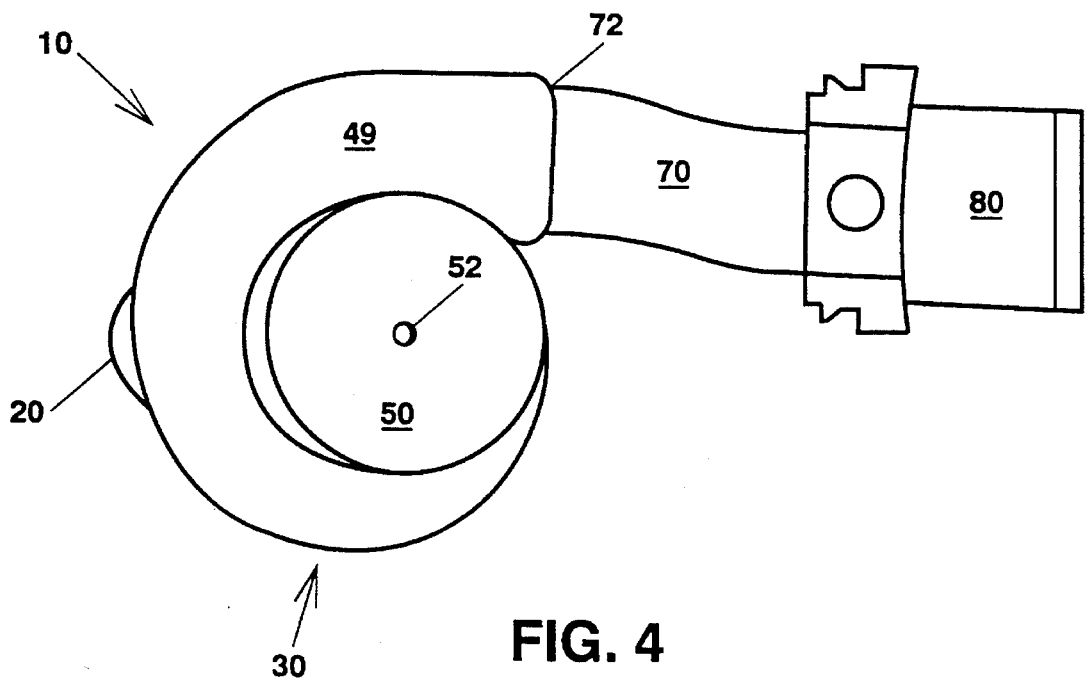
FIG. 4 is a top view of the water jet propulsion system of the present invention.
Figure 5:
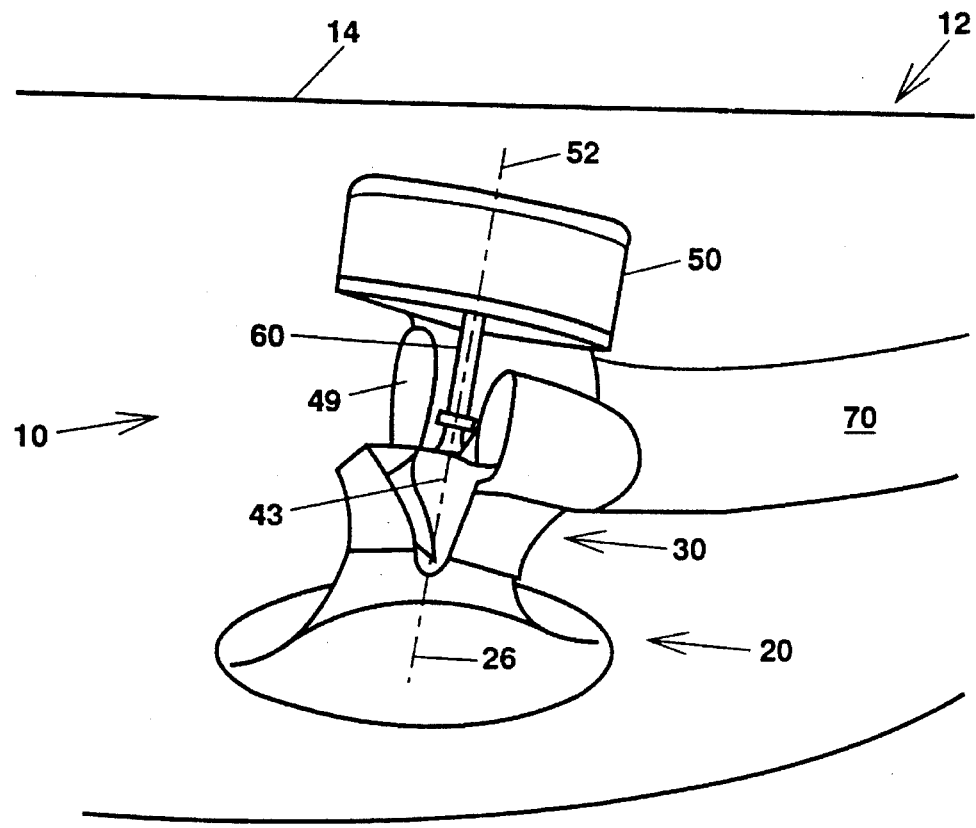
FIG. 5 is a partially cut-away perspective view of the water jet propulsion system of the present invention.

Drive shaft 60 is connected at first end 62 with power means 50 and at second end 64 to back face 44 of impeller 42. Drive shaft 60 is substantially aligned with reference axis 26 of inlet duct 20. Drive shaft 60 may be attached directly to a central rotating member of power means 50 and directly to back face 44 in any well known fashion, such as bolting, screwing, or welding. Alternatively, drive shaft 60 may be attached to either or both of power means 50 and back face 44 by means of couplings, such as a universal joint or ball-and-socket joint, or any other well-known coupling for aligning and attaching rotating parts. In either case, drive shaft 60 is very short when compared to prior art water jet drive shafts as depicted in FIG. 2. Direct coupling of power means 50 and impeller 42 by means of drive shaft 60, without additional gears and/or transmissions, decreases weight and reduces or eliminates transmission losses. Moreover, by placing power means 50 juxtaposed to end wall 36 of pump 30, drive shaft 60 is situated entirely outside the flow passage so as not to interfere with the flow. To attach drive shaft 60 to back face 44, drive shaft 60 penetrates end wall 36. Therefore, suitable, well known bearings and seals are provided between drive shaft 60 and end wall 44 at the penetration.

Downstream flow duct 70 is connected at first end 72 to outlet 40 of pump 30. Downstream flow duct 70 is attached to pump 30 in any well known watertight fashion and the attachment method will not be further described herein. Downstream flow duct 70 includes outlet nozzle 74 at second end 76 thereof. Second end 76 is mounting to aft portion 14 of hull means 12 for discharging accelerated flow from water jet propulsion system 10 in a generally rearward direction. Outlet nozzle 74 may discharge accelerated flow from hull means 12 either at, below or above the waterline. In a preferred embodiment, outlet nozzle 74 is located at aft portion 14 of hull means 12 at or just above the waterline.

In a preferred embodiment, where pump 30 is a volute pump, downstream flow duct 70 is a substantially straight duct (although the duct may have areas of slight curvature to align the outlet nozzle to the desired direction) arranged substantially longitudinally in hull means 12 for discharging accelerated flow in a generally rearward direction. In an alternative embodiment, pump 30 need not include a volute shaped casing discharging flow from the pump outlet in a generally rearward direction. Consequently, downstream flow duct 70 may include curved portion 77 adjacent first end 72 and straight portion 78 adjacent second end 76. Curved portion 77 functions to redirect accelerated flow leaving outlet 40 of pump 30 into straight portion 78 wherein the accelerated flow is discharged from nozzle 74 in a generally rearward direction. Curved portion 77 has a curvilinear cross-section (e.g., an elliptical cross-section) defining a cross-sectional area. Curved portion 77 defines the turning angle of the flow. Preferably, the cross-sectional area is distributed angularly along the length of curved portion 77 such that the average angular momentum of the flow in curved portion 77 remains constant.

The elements of water jet propulsion system 10 that define the flow passages from inlet opening 23 of inlet duct 20 to outlet nozzle 74 are in watertight flow communication by means of inlet duct 20, pump 30, and downstream water duct 70. Appropriate means of connecting the aforementioned elements together for watertight flow communication (including associated seals) and of mounting them to hull means 12 are well-known and are not intended to limit the present invention.

Figure 9:
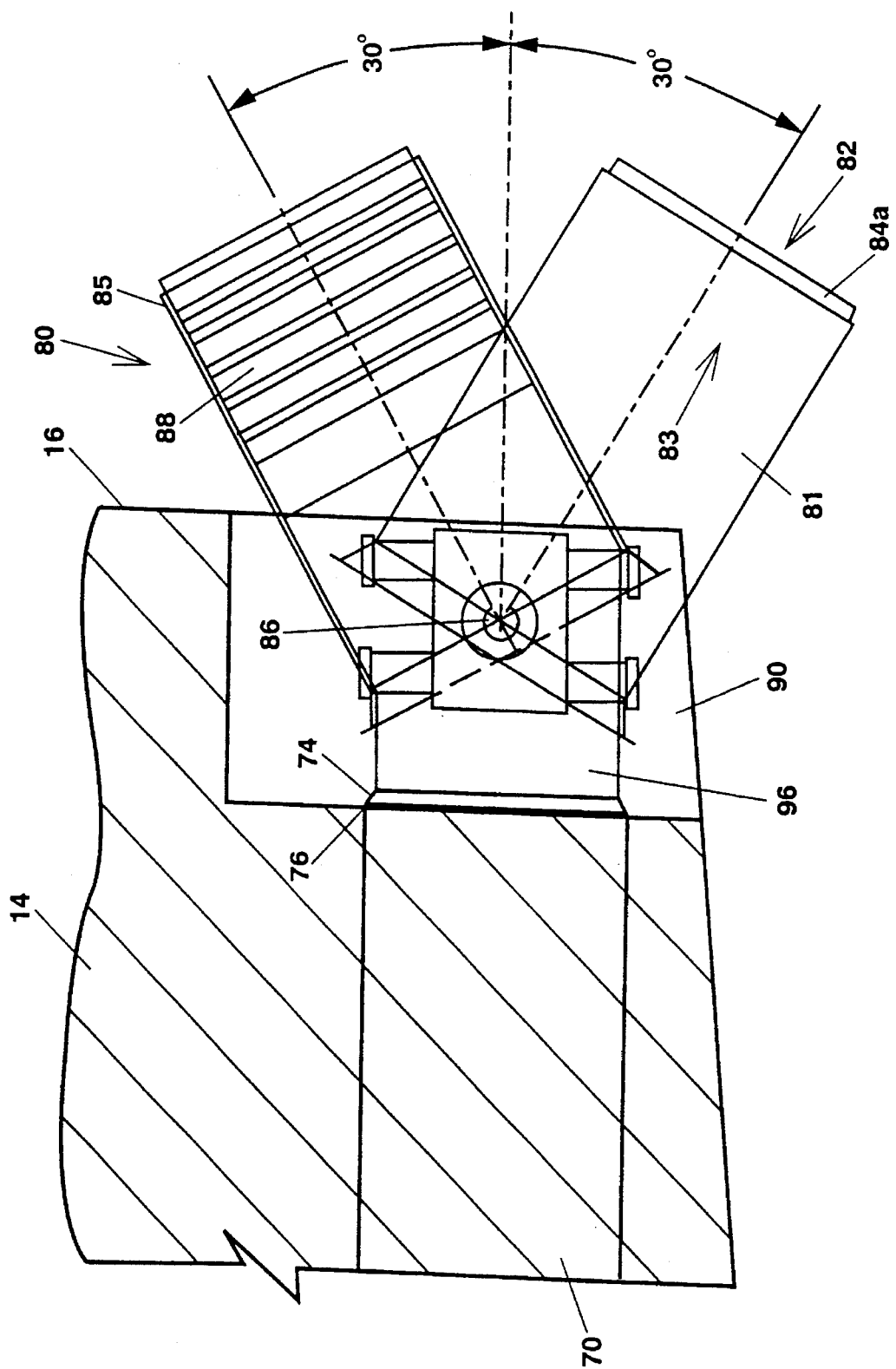
FIG. 9 is a plan view of the steering and reversing mechanism of the present invention.
Figure 10:
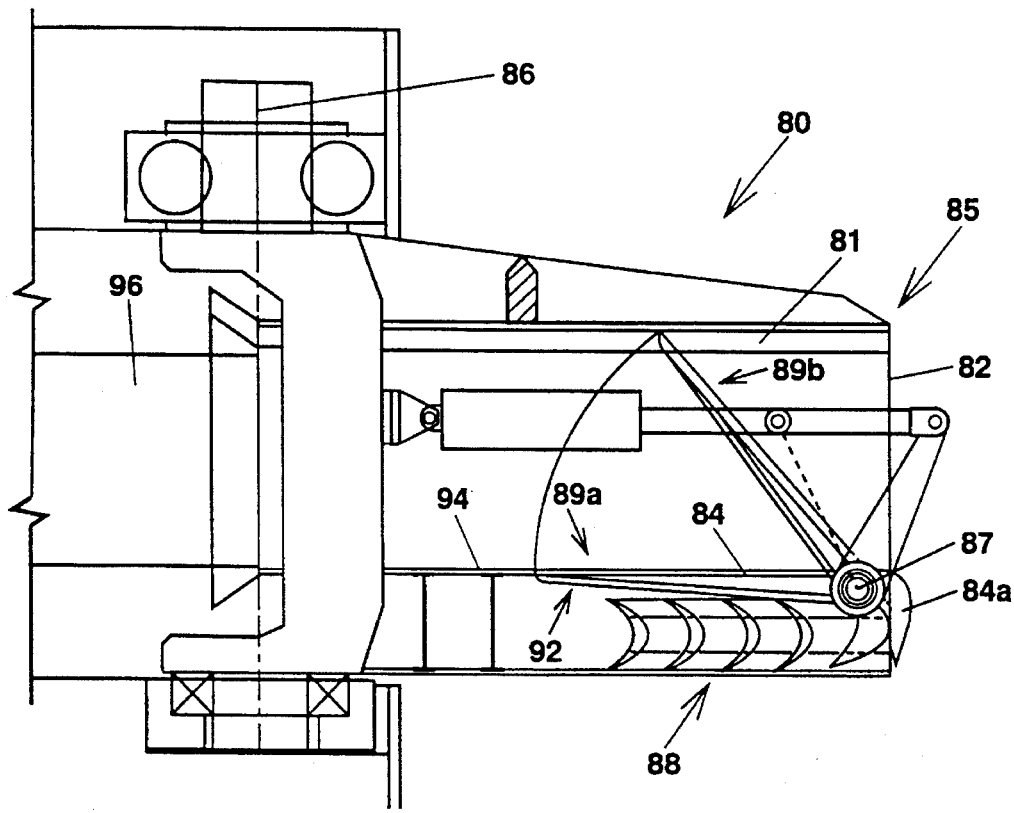
FIG. 10 is a side view of the steering and reversing mechanism of the present invention.
Figure 11:
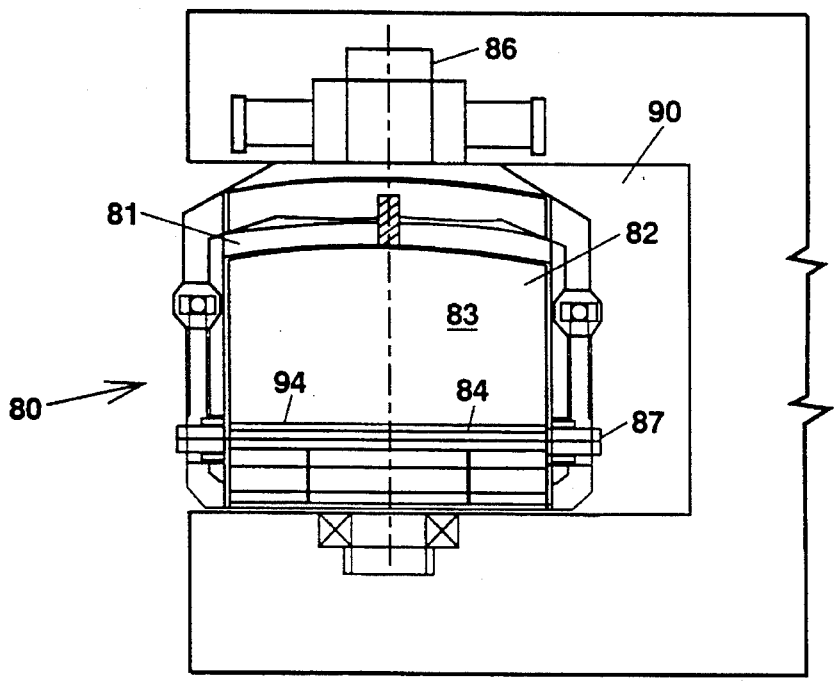
FIG. 11 is a back view of the steering and reversing mechanism of the present invention.

Referring to FIGS. 9–11, the present invention may further include at least one steering and reversing mechanism 80 for receiving flow from outlet nozzle 74 and functioning to redirect the flow 96 received from outlet nozzle 74 so as to provide maneuvering capability to the vehicle. Steering and reversing mechanism 80 deflects flow subsequent to its leaving nozzle 74 and, consequently, nozzle 74 may remain stationary. Steering and reversing mechanism 80 is more fully described in co-pending and co-owned U.S. patent application entitled "Hull Supported and Internally Actuated Steering and Reversing Gear for Large Water Jets" and identified as application Ser. No. 08/313,612 filed Sep. 30, 1994, now U.S. Pat. No. 5,439,402, incorporated herein by reference.

Steering and reversing mechanism 80 generally includes steering sleeve 81 defining flow passage 83 having rearwardly facing outlet 82 and at least one pivotal reversing vane 84 pivotably mounted to aft end 85 of sleeve 81. In a preferred embodiment, a plurality of stationary curved vanes 88 are rigidly mounted to the bottom of sleeve 81 below reversing vane 84 to deflect water leaving pivotal reversing vane 84. Steering sleeve 81, which is a nozzle or tube, preferably nominally a square or rectangular tube, for deflecting free jet flow 96, received from outlet nozzle 74, from side-to-side, is pivotably mounted about a substantially vertical axis to aft portion 14 of hull means 12. Mechanism 80 may be pivotably mounted directly to the surface of hull means 12 or may be pivotably mounted to hull means 12 in watertight recess 90 in aft portion 14 of hull means 12. Generally, mechanism 80 is mounted near stern 16, or at the transom, and is at or near the waterline. In a preferred embodiment, mechanism 80 is located at or only slightly above the waterline. Since, in the preferred embodiment, inlet duct 20 is short, and thus pump 30 is located low in the hull, pumped water need not be raised a substantial amount in order to enter sleeve 81. If mounted in recess 90, mechanism 80 is pivotable approximately 30° to port and starboard from a substantially longitudinally oriented position.

Prior art water jet propulsors for which steering and reversing capability is provided by the water jet propulsor itself (rather than rudders) have the steering and reversing gear attached directly to the water jet pump or outlet nozzle. Thus, the water jet system provides structural support to the steering and reversing gear which, in turn, transmits the large maneuvering forces and moments to the system. Furthermore, the weight of the steering and reversing gear produces additional stress on the system. In the present invention, steering and reversing mechanism 80 is mounted to hull means 12 completely independent of nozzle 74. Consequently, the weight of mechanism 80 and the steering and reversing forces produced by it are not supported by water jet propulsion system 10 but are transmitted directly to the hull, thus allowing water jet system structure to be smaller and lighter.

Nozzle 74 directs flow 96 into sleeve 81 of mechanism 80 which deflects the jet laterally to provide directional control to the vehicle. Sleeve 81 is sized such that it captures the entirety of flow 96 leaving nozzle 74 at all pivot angles of mechanism 80. Because mechanism 80 is pivotably mounted about a substantially vertical axis to aft portion 14 of hull means 12 it may be rotated about its axis in the same way as conventional rudders using conventional, well-known steering machinery with the rudder post replaced by steering sleeve spindle 86. As an example, steering sleeve 80, which contains reversing vane 84, may pivot about pivot shaft or spindle 86 (either a single shaft or an upper and a lower shaft) and upper and lower bearing mounts which are fitted with watertight seals. Pivot shaft 86 may penetrate either or both of the upper and lower bearing mounts into hull means 12 where one or both are connected to steering gear actuators. Steering actuation may be executed, for example, by means of a bell-crank and double actuating hydraulic cylinder, or by a rack-and-pinion gear type of linear actuator driven by an electric or hydraulic motor.

Reversing vane 84 is preferably a flat vane pivotably mounted on pin or spindle 87 to aft end 85 of sleeve 81. Reversing vane 84 may further include curved vane portion 84a depending from its aft end. When reverse thrust is not required, vane 84 lies flat in sleeve 81 to provide all or a part of the bottom wall or surface of flow passage 83. In this closed position, vane 84 does not interfere with flow through sleeve 81. When in use, vane 84 may be rotated, for example, by a simple bell-crank arrangement, one on each side of sleeve 81 (either internally or externally of sleeve 81) each operated by a double-actuating hydraulic cylinder, in the manner of large earth-moving equipment. As vane 84 pivots from substantially horizontal closed position 89a to fully open positions 89b, it creates aperture 92 in bottom surface 94 of flow passage 83 of sleeve 81. At the same time its forward edge engages the jet flow, thus, deflecting part or all of the flow downward through aperture 92 to provide stopping and reversing thrust. When vane 84 is at maximum pivot 89b, its forward edge rests against the top edge of sleeve 81 closing off flow passage 83 of sleeve 81 and diverting virtually all of the flow, thus providing maximum reverse thrust. Preferably, a plurality of stationary curved vanes 86 are mounted lateral to and integral with sleeve 81 below vane 84, in the area of bottom aperture 92 opened by the pivoting of vane 84, for receiving flow deflected by reversing vane 84 and redirecting the flow in a generally downward and forward direction to provide additional turning of the jet flow directed by reversing vane 84 through aperture 92.

Details of integrated inlet duct 20 will now be provided. Inlet performance is critical to the energy efficiency of water jet propulsion systems. Water jet propulsion system inlets operate in very complex three-dimensional flow regimes that present potential cavitation, ventilation, and energy loss problems. Water jet efficiency is influenced by inlet system drag and internal losses. In addition, pump cavitation is highly dependent on inlet duct energy recovery and velocity distribution at the outlet plane (terminal plane) of the inlet duct. To design an inlet duct that fully addresses these problems and which allows for flexible placement of the inlet opening at either symmetric or non-symmetric hull surface locations, an unconstrained three-dimensional flow regime must be considered in designing the inlet duct geometry. Moreover, the influence of the inlet and pump suction on the wake field into the inlet must be considered and negative effects minimized.

Accordingly, the inlet duct and adjacent portions of the hull surface must be designed together as one integrated hydrodynamic unit. The design method should result in an integrated inlet duct that provides superior overall propulsive efficiency over the operating speed range, without inducing cavitation or flow separation and without increasing vehicle resistance. In order to provide these results, the design procedure preferably followed in designing integrated inlet duct 20 for providing efficient transmission of a substantially cavitation free fluid flow uses an iterative process that minimizes thrust deduction fraction and, thus, increases hull efficiency and ultimately overall propulsive efficiency. Moreover, to prevent cavitation, minimum pressure in integrated inlet duct 20 should remain above the water's vapor pressure. Lastly, pressure gradients in integrated inlet duct 20 and over aft portion 14 of the hull means 12 should not be so severe as to induce flow separation.

In the specification and claims, the term "integrated inlet duct," when referring to integrated inlet duct 20, is intended to indicate an inlet duct having an internal surface geometry that possesses the favorable flow characteristics described herein, is restricted by the geometric parameters and hydrodynamic constraints described herein, and is ascertained by the following described methodology. The design methodology employed in designing integrated inlet duct 20 of the present invention is more fully described in co-pending and co-owned U.S. patent application entitled "Design of an Integrated Inlet Duct for Efficient Fluid Transmission" and identified as application Ser. No. 08/314,278, filed Sep. 30, 1994, now U.S. Pat. No. 5,439,402 incorporated herein by reference.

The design of integrated inlet duct 20 having positive pressure characteristics and low thrust deduction fraction over the operating speed range requires evaluating inlet flow at both design and off-design speeds. This is a multi-point design problem requiring close coupling between hydrodynamic design and geometric design of the inlet duct and adjacent hull surface. Inlet duct geometry is optimized through a multi-variant optimization technique. The design process is an iterative process that employs software to generate the inlet duct surface geometry (a listing of which is attached to the above referenced application identified as application Ser. No. 08/314,278 filed Sep. 30, 1994, now U.S. Pat. No. 5,439,402) linked to well-known panel method software to model the hull and inlet duct and to determine the flow characteristics, i.e., velocity distributions, pressures, and resulting forces and thrust deduction fraction. The numerical determination of these flow characteristics is well known to Naval Architects and Hydrodynamicists of ordinary skill and will not be described herein.

The particular panel method program used is not essential and is not intended as a limitation on the present invention. Examples of such numerical programs include VSAERO and MIT PSF 10 software codes. These programs, which employ panel methods to model the hull and inlet duct and incompressible potential flow theory to compute pressures and velocity distributions, are well known in the art and will not be described in detail here. VSAERO is available from Analytical Methods, Inc. of Redmond, Wash. 98052, and is described in an AMI Report entitled "PROGRAM 'VSAERO' A Computer Program for Calculating the Nonlinear Aerodynamic Characteristics of Arbitrary Configurations," prepared by B. Maskew under Contract NAS2-11945 for NASA Ames Research Center (December 1984). MIT PSF 10, available from the Massachusetts Institute of Technology, is described in Massachusetts Institute of Technology Doctoral dissertation entitled, "Development and Analysis of Panel Methods for Propeller Unsteady Flow," by Ching-Yeh Hsin (1990). An example of a preprocessor for the above programs is the AGPS software code commercially available from Boeing. AGPS provides panel grid points (corner points of the panels) for input into the above programs.

Desired flow characteristics of integrated inlet duct 20 include: substantially uniform flow (uniform pressure, velocity, and direction of flow) to impeller 42 over a wide speed range; minimum energy losses; no flow separation during operation; and no surface cavitation. Based on these characteristics, the following hydrodynamic design constraints are imposed on the geometric design of integrated inlet duct 20: optimize pressure on inlet duct and adjacent hull surfaces to minimize thrust deduction fraction (good pressure recovery aft of the inlet duct is required for minimum thrust deduction); require minimum absolute pressure at any point on the inlet duct surface to remain above the vapor pressure of the water; and minimize pressure gradients in axial and circumferential directions inside the duct. Furthermore, the following geometric design parameters are imposed on the design: the internal contour of integrated inlet duct 20 is a Bezier surface; the shape of inlet exit 25 is a circle; the length of integrated inlet duct 20 should be as short as possible to minimize viscous losses, and preferably it should be less than or equal to the diameter of impeller 42; and inlet duct inclination angle 28 should be as steep as possible, and in no case less than 45° relative to the inlet plane. By providing an inlet duct geometry comprising a uniquely defined Bezier surface that meets the above listed hydrodynamic and geometric design constraints, integrated inlet duct 20 of the present invention possess the above listed flow characteristics while providing good propulsive efficiency at the design speed and improved propulsive efficiency at off-design speeds.

The iterative design procedure for optimizing the geometry of integrated inlet duct 20 is based on optimizing the pressure on the surface of the duct and adjacent hull. The internal surface geometry of integrated inlet duct 20 determines the pressures in the inlet duct. Thus, optimizing the duct design involves iteration between duct geometry and resulting pressures to meet design constraints. The iterative design procedure includes the following steps:

1. generate a panel representation of hull means 12 in the barehull configuration (without integrated inlet duct 20) and analyze flow over the barehull over the desired speed range to determine a location for inlet opening 23 based on favorable flow characteristics (flow direction and pressure);
2. determine an internal surface geometry for integrated inlet duct 20 within the geometric and hydrodynamic design constraints specified, the surface being represented by a series of fifth order Bezier cross-link curves;
3. generate a panel representation of integrated inlet duct 20, the surface of which is defined by the series of Bezier curves determined during step 2, and an adjacent patch of hull means 12;
4. calculate pressure and velocity distributions of flow over the patch of hull means 12 and within integrated inlet duct 20 with pump suction effect included (the modeling of pump suction by a patch of sinks located at the exit plane of integrated inlet duct 20 is well know and will not be described in detail herein);
5. evaluate the duct geometry based on positive pressure characteristics and low thrust deduction fraction as detailed in the design constraints listed above (assume trim remains constant);
6. repeat steps 2 through 5 for subsequent iterations of inlet duct geometry until the design constraints are satisfactorily met at a predetermined design condition (the hydrodynamic design constraints may not be identically met, therefore, the geometry that optimizes the flow characteristics, based on the specified hydrodynamic constraints as a goal, is chosen);
7. evaluate the resulting duct geometry at off-design conditions;
8. repeat steps 2 through 5 for geometric refinement of inlet duct geometry until design constraints are satisfactorily met at off-design conditions;
9. perform local refinement of fillet geometry to optimize pressure in the areas of maximum curvature adjacent inlet opening 23 (more fully described in the above referenced application identified as application Ser. No. 08/314,278 filed Sep. 30, 1994, now U.S. Pat. No. 5,439,402, incorporated herein by reference);
10. generate a panel representation of integrated inlet duct 20, including local refinement of inlet fillet geometry, and an adjacent patch of hull means 12;
11. calculate pressure and velocity distributions of flow over the patch of marine vehicle 10 and within integrated inlet duct 20 with pump suction effect included;
12. evaluate the resulting design at desired operating conditions; and
13. repeat steps 9 through 12 for local refinement of inlet fillet geometry until design constraints are optimally met.

Step 2–13 of the above process provides the unique internal surface geometry for integrated inlet duct 20 of the present invention. The nominal surface geometry of integrated inlet duct 20 is specified by inlet exit 25, which is fixed, and five major design parameters, each of which may vary during the iterative design process. As shown in FIG. 6, inlet exit 25 is a circle arranged perpendicularly to reference axis 26. The five variable design parameters are: (1) shape of inlet opening 23; (2) inlet duct inclination angle 28; (3) length of integrated inlet duct 20 from inlet plane to terminal plane; (4) aspect ratio of inlet to exit (area of inlet opening 23/area of inlet exit 25); and (5) local geometric refinement of fillet 29. Iterations on parameters 1 through 4 are performed during step 2 through 8. Iterations on parameter 5 are performed during steps 9 through 13.

The first iteration of inlet duct geometry (initial input to step 2) is determined by the designer based on gross sizing information of water jet propulsion system 10 and guided by theory and experience. The required shape of inlet exit 25 is a circle (i.e., inlet exit 25 has a circular cross-section at the terminal plane of integrated inlet duct 20). Furthermore, it is required that inlet exit 25 be positioned perpendicularly to central reference axis 26 and be arranged concentrically therewith. Based on the desired water jet system mass flow rate and exit head, the area of circular inlet exit 25 (i.e., cross-sectional area at the terminal plane) is determined. Generally, the diameter of inlet exit 25 is substantially equal to the diameter of impeller 42. The area of inlet exit 25 remains fixed throughout the iterative design process. The nominal shape of inlet opening 23 is curvilinear, preferably a circle, ellipse, or oval. Inlet duct inclination angle 28 is between about 45° and about 75°. The angle should be as steep as possible in order to provide improved performance at off-design speeds. Inclination angle 28 is the angle between centrally located reference axis 26 and the inlet plane. The length of integrated inlet duct 20, which should be as short as possible to minimize duct losses, is preferably less than or equal to about the diameter of impeller 42.

Subsequent iterations of inlet duct geometry (accomplished during repeated step 2, as performed during step 6, and during repeated step 9, as performed during step 13) are based on the hydrodynamic analysis and evaluation of the preceding duct geometry (performed during steps 4–5 and steps 11–12, respectively) and on modifications of duct geometry by the designer based on his or her experience and theoretical knowledge of how best to optimize the resulting flow. The manipulation of the duct geometry, as performed during steps 2 and 9, is facilitated by the use of Inlet Geometric Design Module which is more fully described hereinafter.

The geometric shape of integrated inlet duct 20, as constrained by the above design parameters and design constraints, is a Bezier surface characterized by a series of fifth-order Bezier cross-link curves. Each Bezier curve is explicitly and uniquely defined by five control points which are the independent variables of the Bezier basis function. The generation of Bezier curves based on Bezier control points and tangency conditions, as described for example in Mortenson, Michael E., *GEOMETRIC MODELING*, New York, John Wiley and Sons, Inc., 1985, QA447.M62, is well known and will not be described in detail herein. Control points 1 through 5 of each Bezier curve are defined by stations 1 through 5, respectively, located in axially spaced planes along integrated inlet duct 20. Each Bezier curve has one control point nominally located on the periphery of each of the five stations. Thus, control points 1–5 are defined by stations 1–5, respectively.

The five stations are determined as follows: station 1 coincides with inlet opening 23; station 5 coincides with inlet exit 25; stations 2 and 4 are based on constraining the tangency conditions at stations 1 and 5, respectively (determine flow tangency with the inlet duct at the inlet plane and the terminal plane, respectively); and station 3, which determines the shape of fillet 29, is based on the requirement of a smooth transition and attached flow (no separation) between the inlet region defined by stations 1 and 2 and the exit region defined by stations 4 and 5. A predetermined equal number of points are distributed around the circumference of each the five stations and, thus, establishes a like number of sets of five control points. A Bezier cross-link curves is generated for each set of five control points. The number of Bezier curves (and corresponding number of points per station), based on a trade off between computing economy and required definition of the surface geometry to provide an acceptable hydrodynamic evaluation of the resulting flow, is selected by the designer based on knowledge and experience. Each curve is determined independently, however, the location of stations 1–5 and of the control points on each station are constrained to producing a family of curves defining a continuous smooth surface. Thus, the inlet duct contour is produced by forming smooth transitions between adjacent curves to form a continuous smooth surface.

Internal surface geometry of integrated inlet duct 20 is systematically determined as follows:

(a) determine shape and area of inlet opening 23 (initially designer's choice within listed constraints), wherein the inlet opening has an aspect ratio of a major to a minor dimension associated therewith, and wherein the inlet opening is located in the inlet plane;

(b) determine inlet duct inclination angle 28 (initially designer's choice within listed constraints);

(c) determine length of integrated inlet duct 20 (initially designer's choice within listed constraints);

(d) determine stations 1 through 5, wherein stations 1 through 5 determine the placement of the series of five associated control points, each of stations 1 through 5 being nominally located in a plane, stations 1 through 5 defined as follows:

(i) station 1 coincides with inlet opening 23 at the inlet plane, wherein the plane of station 1 nominally coincides with the inlet plane, the aspect ratio of station 1 is equal to the aspect ratio of inlet opening 23, and wherein control points on station 1 are located around a periphery of inlet opening 23;

(ii) station 5 coincides with inlet exit 25 at the exit plane, wherein the plane of station 5 coincides with the exit plane, wherein inlet exit 25 is a circle and is arranged perpendicularly to reference axis 26 and concentrically therewith, and further wherein control points on station 5 are located around a periphery of inlet exit 25;

(iii) station 4 is a circle arranged perpendicularly to reference axis 26 (thus stations 4 and 5 define a cylinder that is concentric with reference axis 26) and is specified by the tangency conditions of the Bezier curve at station 5 and the distance between station 4 and 5 (the distance between stations 4 and 5 determines the extent to which the Bezier curve is tangent to the cylinder defined by stations 4 and 5—the greater the distance, the longer the curve remains tangent);

(iv) station 2 is required to be in the same nominal plane as station 1 (tangency condition of the Bezier curve at station 1), must be completely circumscribed by station 1, and has the same aspect ratio of major to minor dimensions as station 1;

(v) station 3 is nominally perpendicular to reference axis 26 and is iteratively determined, preferably using the Inlet Geometric Design Module, based on the requirement of a smooth transition between the inlet curve, as constrained by stations 1 and 2, and the exit curve, as constrained by stations 4 and 5, such that the resulting flow follows the curve (i.e., resulting pressure gradients that prevent flow separation);

(e) distribute a predetermined number X of peripherally distributed control points around each of stations 1 through 5, the control points provide X sets of five control points, initially each set nominally defining a plane passing through the five control points and reference axis 26;

(f) generate a series of X Bezier curves, each Bezier curve uniquely defined by a set of five control points; and (g) interpolate a predetermined number of points along the Bezier curves to serve as grid points for panel representation of inlet duct surface.

Each of control points 1–5 influences the curve in the vicinity of that point. The final location of the control points is constrained to producing a family of curves, and resulting duct geometry, such that the flow remains tangent to the duct at the inlet plane and terminal plane and follows the surface of the duct therebetween without flow separation. Station 5 is fixed throughout the iterative process. Consequently, stations 1 through 4 are systematically varied during the iterative process in order to optimize duct geometry.

Each resulting inlet duct geometric arrangement is evaluated by panel method and potential flow theory, using commercially available software as detailed above. The geometric arrangement of the inlet duct surface, as defined by the series of X Bezier curves, establishes the pressure and velocity distribution within integrated inlet duct 20 and influences the pressure and velocity distribution over aft portion 14 of hull means 12. Therefore, the geometric arrangement of integrated inlet duct 20 is determined so that, over the desired speed range, thrust deduction fraction is minimized, absolute pressure remains above the vapor pressure of the water at all points on the surface of integrated inlet duct 20, and pressure gradients over the panel model are optimized. Once a panel representation of a particular iteration of duct geometry is generated and the resulting flow is analyzed, the designer must evaluate the pressures and velocity distributions to see if the design constraints are sufficiently met. If the design constraints are not met to the satisfaction of the designer, the designer must use his or her knowledge of hydrodynamics and duct design to modify the duct geometry.

The Inlet Geometric Design Module employed in steps 2 and 9 provides the mechanism by which the designer may directly manipulate the inlet duct surface geometry and, thus, the placement of Bezier curve control points that define the surface curves. A software listing of the Inlet Geometric Design Module is provided in the Appendix attached to the above referenced application identified as application Ser. No. 08/314,278.

The geometric contour of integrated inlet duct 20 is iteratively designed using the herein described design methodology. The Inlet Geometric Design Module provides the designer the tool to interactively modify the surface geometry during the iterative process. The Inlet Geometric Design Module and resulting Bezier curves provide a direct input to the panel method software for defining the panel representation of the surface contour of integrated inlet duct 20. The inlet duct surface data information of the final panel method representation may then be linked to any of numerous well known computer aided design/computer aided manufacturing (CAD/CAM) software packages to provide surface coordinates of the duct surface. The data may then be input into, for example, a numerical cutting or milling machine to produce the finished product. Alternatively, the methods described in U.S. Pat. Nos. 5,282,143 entitled "Method and System for Machining a Sculptured Surface" and 5,236,637 entitled "Method of and Apparatus for Production of Three Dimensional Objects by Stereolithography," both incorporated herein by reference, may be used to produce the finished duct shape.

The advantages of the present invention are numerous. The water jet propulsion system of the present invention provides a compact water jet design having high propulsive efficiency and good maneuvering characteristics over a wide speed range (see FIG. 1). Relative to prior art water jet propulsion systems, off-design point performance, especially low speed performance, is improved. The short inlet duct minimizes inlet duct losses, while maximizing water jet performance characteristics over a wide speed range. The short flow channel required allows the inlet duct and water jet pump to be located very close to the outlet nozzle to minimize flow losses. The short drive shaft, located completely outside the water jet flow path so as not to interfere with the flow, eliminates flow energy losses associated with designs having drive shafts that impinge the jet flow and decreases overall system weight. The integrated stern/flush inlet design minimizes or eliminates separation and provides a substantially cavitation free flow of water to the water jet pump over a wide speed range. The high mass flow rate, low head, mixed-flow pump enhances cavitation performance and increases system efficiency. The steering and reversing mechanism allows for minimum system weight for a given nozzle size.

The compact design of the present invention allows greater flexibility of placement within the hull. When coupled with an electric drive motor, the power generating equipment may be flexibly located based on optimum weight distribution and/or space considerations. The compact design allows for ease of access to propulsion machinery for maintenance or repair. The inlet provides a system with no air ingestion problems and that affords protection for the propulsion machinery from external objects.

The water jet propulsion system of the present invention is applicable both to marine vehicles such as large monohulls and tug boats that require good low speed performance (high propulsive efficiency or high thrust at low speed) and to high speed vehicles such as planing hulls, surface effect vessels, recreational crafts, and jet skis that require good high speed performance. Most components of the water jet propulsion system can be scaled according to power requirements with the inlet duct being the only component designed for the particular application.

The present invention and many of its attendant advantages will be understood from the foregoing description and it will be apparent to those skilled in the art to which the invention relates that various modifications may be made in the form, construction and arrangement of the elements of the invention described herein without departing from the spirit and scope of the invention or sacrificing all of its material advantages. The forms of the present invention herein described are not intended to be limiting but are merely preferred or exemplary embodiments thereof.

What is claimed is:

1. A compact water jet propulsion system for providing an accelerated propulsion flow to a marine vehicle, said water jet propulsion system comprising:

an integrated inlet duct adapted for mounting to a surface of the vehicle at an aft portion of the vehicle and extending internally thereof, said inlet duct extending between an initial end and a terminal end, said initial end circumscribing an inlet opening and defining an inlet plane wherein said inlet opening has a curvilinear cross-section at said inlet plane, said terminal end circumscribing an inlet exit and defining a terminal plane wherein said inlet exit has a circular cross-section at said terminal plane, said inlet duct having a centrally located reference axis extending from said inlet plane to said terminal plane wherein said reference axis defines an inclination angle relative to said inlet plane, said inclination angle being between about 45° and about 75°, and further wherein said terminal plane is perpendicular to said reference axis and said inlet exit is arranged concentrically with said reference axis;

a pump including a casing having at least one side wall and an end wall forming an impeller chamber, an axial inlet opposite said end wall, at least one outlet, and an impeller rotationally mounted in said impeller chamber, said impeller having a back face located adjacent said end wall and a front face having a plurality of radially extending impeller blades projecting axially therefrom toward said axial inlet, said at least one side wall and said impeller defining a flow passage, said pump being attached at said axial inlet to said terminal end of said inlet duct;

power means for rotating said impeller;

a drive shaft connected at a first end with said power means and at a second end to said back face of said impeller wherein said drive shaft is situated entirely outside said flow passage; and a downstream flow duct connected at a first end to said at least one outlet of said pump and having an outlet nozzle at a second end thereof, said second end being adapted for mounting to the aft portion of the vehicle.

2. A compact water jet propulsion system as in claim 1, wherein a length of said inlet duct from said inlet opening to said inlet exit is less than or equal to a diameter of said impeller.

3. A compact water jet propulsion system as in claim 1, wherein said inlet duct at said initial end is adapted to be mounted flush with the surface of the marine vehicle and wherein a peripheral fillet of said duct adjacent said inlet opening is shaped to form a smooth transition between said inlet duct and the surface of the vehicle to provide a substantially cavitation free flow to said impeller and to substantially eliminate flow separation at said fillet.

4. A compact water jet propulsion system as in claim 1, wherein said curvilinear transverse cross-section is chosen from the group consisting of a circle, an ellipse and an oval.

5. A compact water jet propulsion system as in claim 1, wherein an internal shape of said inlet duct defines a Bezier surface, said Bezier surface being defined by a series of fifth order Bezier cross-link curves.

6. A compact water jet propulsion system as in claim 1, wherein said casing comprises a volute casing, said volute casing having an axially extending annular flow chamber surrounding said impeller and a volute shaped flow chamber downstream of said impeller, and further wherein an axis of rotation of said impeller is substantially aligned with said reference axis and a lowest axially extending end of said impeller is substantially aligned with said inlet exit.

7. A compact water jet propulsion system as in claim 6, wherein said volute shaped flow chamber defines a turning angle of the flow, said volute shaped flow chamber having an elliptical cross-section defining a cross-sectional area, and wherein said cross-sectional area is distributed angularly along said volute shaped flow chamber such that the average angular momentum of the flow in said volute shaped flow chamber is constant.

8. A compact water jet propulsion system as in claim 1, wherein said pump is a high mass flow rate, low head, mixed-flow pump having a mixed-flow impeller with a substantially radial discharge.

9. A compact water jet propulsion system as in claim 1, wherein an axis of rotation of said impeller is substantially aligned with said reference axis of said inlet duct.

10. A compact water jet propulsion system as in claim 1, wherein said power means is an electric motor, said electric motor being juxtaposed with said pump end wall such that an axis of rotation of said electric motor is substantially aligned with said reference axis of said inlet duct.

11. A compact water jet propulsion system as in claim 1, wherein said drive shaft is substantially aligned with said reference axis of said inlet duct.

12. A compact water jet propulsion system as in claim 1, wherein said downstream flow duct includes a curved portion adjacent said first end and a straight portion adjacent said second end, said curved portion defines a turning angle of the flow, said curved portion having an elliptical cross-section defining a cross-sectional area wherein said cross-sectional area is distributed angularly along said curved portion such that the average angular momentum of the flow in said curved portion is constant, said curved portion functioning to redirect accelerated flow leaving said pump outlet into said straight portion wherein said accelerated flow is discharged from said nozzle in a generally rearward direction.

13. A compact water jet propulsion system as in claim 1, further comprising a steering and reversing mechanism for receiving flow from said outlet nozzle, wherein said steering and reversing mechanism comprises:

a hollow steering sleeve defining a flow passage having a rearwardly facing outlet, said steering sleeve adapted to be pivotably mounted about a substantially vertical axis to the aft portion of the vehicle; and at least one reversing vane pivotably mounted to said sleeve, said reversing vane pivotal between a first substantially horizontal position wherein said reversing vane functions as at least a portion of a bottom surface of said flow passage, and a second position wherein said reversing vane closes said rearwardly facing outlet and defines an aperture in said bottom surface of said flow passage wherein the flow is deflected by said reversing vane through said aperture, wherein said mechanism acts independent of said outlet nozzle to redirect the flow received from said outlet nozzle so as to provide maneuvering capability to the vehicle.

14. A compact water jet propulsion system as in claim 13, wherein said steering and reversing mechanism further comprises a plurality of stationary curved vanes, said curved vanes mounted laterally to and integral with said steering sleeve and below said reversing vane for receiving flow deflected by said reversing vane through said aperture and redirecting the flow in a generally downward and forward direction.

15. An integrated hull and water jet propulsion system for a marine vessel, comprising:

a hull means; and at least one water jet propulsion system, said at least one water jet propulsion system being positioned at an aft portion of said hull means, said at least one water jet propulsion system, comprising:

an integrated inlet duct for redirecting water flowing along said hull means into said system, said inlet duct adapted for mounting to a surface of said hull means and extending internally thereof, said inlet duct extending between an initial end and a terminal end, said initial end circumscribing an inlet opening and defining an inlet plane, said terminal end circumscribing an inlet exit and defining a terminal plane, said duct having a centrally located reference axis extending from said inlet plane to said terminal plane wherein said reference axis defines an inclination angle relative to said inlet plane, said inclination angle being between about 45° and about 75°;

a pump for accelerating the flow redirected into said system, said pump including a casing having at least one side wall and an end wall forming an impeller chamber, an axial inlet opposite said end wall, at least one outlet, and an impeller rotationally mounted in said impeller chamber, a rotation axis of said impeller aligned with said reference axis of said inlet duct, said impeller having a back face located adjacent said end wall and a front face having a plurality of radially extending impeller blades projecting axially therefrom toward said axial inlet, said at least one side wall and said impeller defining a flow passage, said pump being attached at said axial inlet to said terminal end of said inlet duct;

a length of said inlet duct from said inlet opening to said inlet exit being less than or equal to a diameter of said impeller;

power means for rotating said impeller;

a drive shaft connected at a first end with said power means and at a second end to said back face of said impeller wherein said drive shaft is situated entirely outside said flow passage so as not to interfere with the flow, said drive shaft being substantially aligned with said reference axis of said inlet duct; and a downstream flow duct arranged substantially longitudinally in said hull means, said flow duct connected at a first end to said at least one outlet of said pump and having an outlet nozzle at a second end thereof, said second end being mounted to said aft portion of said hull means for discharging accelerated flow in a generally rearward direction.

16. An integrated hull and water jet propulsion system as in claim 15, wherein said inlet opening has a curvilinear cross-section at said inlet plane, said terminal plane is perpendicular to said reference axis, said inlet exit has a circular cross-section at said terminal plane, said inlet exit being arranged concentrically with said reference axis, and further wherein an internal shape of said inlet duct defines a Bezier surface, said Bezier surface being defined by a series of fifth order Bezier cross-link curves.

17. An integrated hull and water jet propulsion system as in claim 15, wherein said casing comprises a volute casing, said volute casing having an axially extending annular flow chamber surrounding said impeller and a volute shaped flow chamber downstream of said impeller, said volute shaped flow chamber directing flow accelerated by said impeller to said outlet, and further wherein a lowest axially extending end of said impeller is substantially aligned with said inlet exit.

18. An integrated hull and water jet propulsion system as in claim 17, wherein said volute shaped flow chamber defines a turning angle of the flow, said volute shaped flow chamber having an elliptical cross-section defining a cross-sectional area, and wherein said cross-sectional area is distributed angularly along said volute shaped flow chamber such that the average angular momentum of the flow in said volute shaped flow chamber is constant.

19. An integrated hull and water jet propulsion system as in claim 18, wherein said pump is a high mass flow rate, low head, mixed-flow type pump having a mixed-flow impeller with and a substantially radial discharge.

20. An integrated hull and water jet propulsion system as in claim 15, wherein said power means is an electric motor, said electric motor being mounted in juxtaposition with said water jet pump end wall such that an axis of rotation of said electric motor is substantially aligned with said reference axis of said inlet duct.

21. An integrated hull and water jet propulsion system as in claim 15, further comprising a steering and reversing mechanism for receiving flow from said outlet nozzle, wherein said steering and reversing mechanism comprises:

a hollow steering sleeve defining a flow passage having a rearwardly facing outlet, said steering sleeve adapted to be pivotably mounted about a substantially vertical axis to said aft portion of said hull means; and at least one reversing vane pivotably mounted to said sleeve, said reversing vane pivotal between a first substantially horizontally aligned position wherein said reversing vane functions as at least a portion of a bottom surface of said flow passage, and a second position wherein said reversing vane closes said rearwardly facing outlet and defines an aperture in said bottom surface of said flow passage wherein the flow is deflected by said reversing vane through said aperture, wherein said mechanism acts independent of said outlet nozzle to redirect the flow received from said outlet nozzle so as to provide maneuvering capability to said hull means.

22. An integrated hull and water jet propulsion system as in claim 21, wherein said steering and reversing mechanism further comprises a plurality of stationary curved vanes, said curved vanes mounted laterally to and integral with said steering sleeve and below said reversing vane for receiving flow deflected by said reversing vane through said aperture and redirecting the flow in a generally downward and forward direction.

23. An integrated hull and water jet propulsion system as in claim 21, wherein said hull means includes at least one watertight recess in said aft portion, said outlet nozzle opening into said recess, and said steering and reversing mechanism being mounted in said at least one recess such that said mechanism is pivotable approximately 30° to port and starboard from a substantially longitudinally oriented position.

* * * * *